United States Patent
Jenny

(10) Patent No.: US 9,555,765 B2
(45) Date of Patent: Jan. 31, 2017

(54) AIRBAG MODULE ARRANGEMENT FOR A VEHICLE AND VEHICLE WITH THE AIRBAG MODULE ARRANGEMENT

(71) Applicant: GM GLOBAL TECHNOLOGY OPERATIONS LLC, Detroit, MI (US)

(72) Inventor: Thomas Jenny, Alsbach-Hähnlein (DE)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/927,017

(22) Filed: Oct. 29, 2015

(65) Prior Publication Data
US 2016/0121843 A1 May 5, 2016

(30) Foreign Application Priority Data
Oct. 29, 2014 (DE) .................... 20 2014 008 603 U

(51) Int. Cl.
B60R 21/38 (2011.01)
B60R 21/36 (2011.01)

(52) U.S. Cl.
CPC ............... B60R 21/38 (2013.01); B60R 21/36 (2013.01)

(58) Field of Classification Search
CPC .................................. B60R 21/38; B60R 21/36
See application file for complete search history.

(56) References Cited

U.S. PATENT DOCUMENTS

| 6,474,679 | B2 | 11/2002 | Miyasaka et al. |
| 7,410,027 | B2 | 8/2008 | Howard |
| 7,537,073 | B2 | 5/2009 | Kalliske et al. |
| 2004/0074688 | A1* | 4/2004 | Hashimoto ......... B60R 21/2155 180/271 |
| 2008/0238058 | A1 | 10/2008 | Numoto et al. |
| 2008/0308338 | A1* | 12/2008 | Kitte ....................... B60R 21/38 180/271 |
| 2010/0307854 | A1* | 12/2010 | Mildner .................. B60R 21/36 180/274 |
| 2013/0119707 | A1* | 5/2013 | Rick ....................... B60R 21/38 296/187.09 |
| 2013/0285335 | A1* | 10/2013 | Allen ......................... F16J 3/02 277/650 |

(Continued)

FOREIGN PATENT DOCUMENTS

| DE | 10102597 A1 | 9/2002 |
| DE | 102004059817 A1 | 6/2006 |

(Continued)

OTHER PUBLICATIONS

German Patent Office, German Search Report for German Application No. 202014008603.6, dated Jun. 22, 2015.

*Primary Examiner* — Darlene P Condra
(74) *Attorney, Agent, or Firm* — Lorenz & Kopf LLP

(57) ABSTRACT

An airbag module for a vehicle is disclosed. The airbag module includes a module housing, a gas generator in response to an impact of the vehicle, and an airbag for expanding with the gas. The airbag and the gas generator are arranged in the module housing. The airbag module includes an actuator member for carrying out a linear movement and for actuating an unlocking mechanism of an engine bonnet or hood of the vehicle. The actuator member in a position of rest is arranged within the module housing and in an activation position is arranged at least in sections outside the housing.

17 Claims, 7 Drawing Sheets

(56) References Cited

U.S. PATENT DOCUMENTS

2014/0291054 A1* 10/2014 Tanaka .................... B60R 21/36
                                                                180/274
2015/0232058 A1*  8/2015 Fermer .................. E05D 3/125
                                                                180/271

FOREIGN PATENT DOCUMENTS

| DE | 102009033721 A1 | 3/2011 |
| EP | 1295763 A2 | 3/2003 |
| EP | 1464552 A1 | 10/2004 |
| GB | 2368562 A | 5/2002 |
| JP | 2006044569 A | 2/2006 |
| JP | 2006062504 A | 3/2006 |

* cited by examiner

AIRBAG MODULE ARRANGEMENT FOR A VEHICLE AND VEHICLE WITH THE AIRBAG MODULE ARRANGEMENT

CROSS-REFERENCE TO RELATED APPLICATION

This application claims priority to German Patent Application No. 202014008603.6, filed Oct. 29, 2014, which is incorporated herein by reference in its entirety.

TECHNICAL FIELD

The present disclosure pertains to an airbag module arrangement for a vehicle, and more particularly to an engine compartment airbag, which raises an engine bonnet or hood in response to a collision between the vehicle and a non-occupant of the vehicle, such as a pedestrian or cyclist.

BACKGROUND

Devices for the protection of non-occupants of a vehicle in the case of an impact are already sufficiently known. For this, a so-called engine compartment airbag is arranged in an engine compartment of the vehicle, in order to create a buffer zone for the non-occupant on the impact. For example, U.S. Pat. No. 7,410,027 describes an engine bonnet or hood of a vehicle, which is connected with the body of the vehicle via a two-part lever arm. In the closed state, the two-part lever arm is folded. An engine compartment airbag is arranged such that, on expanding, it extends the lever arm and thereby raises the engine bonnet.

SUMMARY

The present disclosure provides a functionally improved and space-saving airbag module arrangement for a vehicle. In particular, an airbag module arrangement for a vehicle (or simply an airbag module) includes a module housing, a gas generator and an airbag. The airbag is constructed as a so-called engine compartment airbag, which reduces or minimizes the effects to a non-occupant of the vehicle, in particular a pedestrian or a cyclist, in the case of an impact onto an engine bonnet, onto a lower margin region of a windscreen and/or on A-columns of the vehicle. In particular, the airbag module is able to be arranged in a defined region beneath the engine bonnet of the vehicle. Preferably, the defined region is arranged, in the direction of travel of the vehicle, between a rear edge of the engine bonnet, directed to the windscreen, and a rear engine compartment seal. In particular, the engine compartment in which an engine block of the vehicle is installed and/or is able to be installed is arranged spaced apart from and/or outside the defined region. Especially, the defined region is separated from the engine compartment by the engine compartment seal. Within the scope of the present disclosure, it is possible that a plurality of airbag modules, e.g. two or more are arranged and/or able to be arranged in the defined region.

The gas generator is constructed to generate gas on and/or after an impact of the vehicle, e.g. a collision with the non-occupant, and to expand, in particular inflate, the airbag with the gas. The airbag and the gas generator are arranged in the module housing. In particular, the airbag and the gas generator are surrounded at least partially or completely by side walls of the module housing.

The airbag module has an actuator member, which is constructed for carrying out a linear movement. Preferably, the actuator member is constructed to carry out the linear movement in line to a longitudinal extent of the gas generator. In particular, the linear movement is directed parallel to a longitudinal extent of the gas generator. The actuator member is constructed for the actuation of an unlocking mechanism of the engine bonnet. Preferably, the unlocking mechanism of the engine bonnet is constructed as a device for the unlocking and/or opening of the engine bonnet. In particular, the unlocking mechanism is constructed as a hinge arrangement with at least one pivot arm, pivotable about a pivot axis. The hinge arrangement is constructed e.g. as a rear engine bonnet hinge directed in the direction of travel.

In the case of an impact-free travel of the vehicle and/or in the case of inactivity of the gas generator, the actuator member preferably adopts a position of rest. In the position of rest, the actuator member is arranged within the module housing, in particular surrounded at least partially, preferably for the most part or completely by the side walls of the module housing.

It is preferred that the actuator member on and/or after activation of the gas generator, in particular on and/or after the impact of the vehicle, especially in an activated state of the gas generator, adopts an activation position. In the activation position, the actuator member is arranged, at least in sections, outside the module housing. In particular, the actuator member actuates the unlocking mechanism when it is situated in the activation position. For example, the actuator member is pressed and/or pushed from within the module housing towards the exterior of the module housing by forces which act on activation of the gas generator. The forces can act on the actuator member e.g. through the ignition of the gas generator and/or through the generation of the gas. Therefore, the gas generator assumes a dual function, by pressing and/or pushing the actuator member, in the activated state, out from the module housing, and additionally the airbag is expanded with the gas.

So that the actuator member can emerge from the module housing, the latter preferably has an opening for this, which is arranged e.g. on one of the side walls. Preferably, the opening is arranged and/or constructed so that it is aligned with the linear movement of the actuator member. Especially, the actuator member moves on and/or after the impact of the vehicle and/or on the activation of the gas generator in the linear movement away from the gas generator, wherein it emerges out of the housing through the opening.

It is advantageous that on and/or after the impact of the vehicle, the unlocking mechanism of the engine bonnet is actuated by the actuator member or by the airbag itself, and the engine bonnet is thereby unlocked. In particular through the expanding of the airbag and/or through the at least partial opening of the engine bonnet, in an advantageous manner a buffer zone for the non-occupant of the vehicle can be created beneath the engine bonnet.

Optionally in addition, the airbag is arranged at least partially and/or in sections in the expanded state outside and/or above the engine bonnet. Here, the expanded airbag covers e.g. a lower margin region of the windscreen and/or the A-columns of the vehicle. In particular, an energy absorption region provided by the airbag is arranged under the engine bonnet and at the same time above the latter. Therefore, on a striking of the non-occupant onto the engine bonnet, against the windscreen and/or against at least one of the A-columns, the effects of the impact may be reduced or minimized. Furthermore, it is advantageous that an installation-space-saving integration of the actuator member can be implemented in the state of rest in the module housing.

The actuation of the unlocking mechanism by the actuator member or by the airbag itself can be functionally and effectively implemented on activation of the gas generator.

In a preferred embodiment of the present disclosure, the actuator member is uncoupled from the unlocking mechanism in the position of rest. Preferably, in the position of rest, the actuator member is arranged spaced apart from and/or spatially separated from the unlocking mechanism. In particular, the module housing, in particular the opening of the module housing in which the actuator member is arranged in the position of rest, is closed. For example, the opening of the module housing can be closed by an airbag material of the air bag, which is arranged in the module housing, in particular from the interior.

Alternatively or optionally in addition it is possible within the scope of the present disclosure that the module housing is closed by a covering arrangement, in particular from the exterior. It is preferred that the airbag material and/or the airbag covering arrangement implement the spatial separation and/or the spaced-apart arrangement of the actuator member and of the unlocking mechanism. Optionally, the airbag module encompasses the covering arrangement, by which the opening of the module housing is covered. Through the covering arrangement, it is prevented in an advantageous manner that dust or dirt can penetrate into the module housing and thereby a functioning of the gas generator and/or of the airbag can be impaired. Furthermore, the airbag module can be installed, dismantled and therefore also exchanged more simply.

For example, the covering arrangement is constructed as a covering film. It is particularly preferred that the covering arrangement is able to be destroyed by the actuator member when it carries out the linear movement. In particular, the covering arrangement is pierced or removed by the actuator member on carrying out the linear movement. Thereby, it is ensured that the actuator member can emerge from the housing unimpeded and can actuate the unlocking mechanism. Furthermore, through the destroyed covering arrangement, it is clearly signaled that the airbag module has been activated and must be replaced.

A preferred embodiment of the present disclosure makes provision that the actuator member is constructed as a cylinder. Preferably, the actuator member, in particular in the construction as a cylinder, is placed and/or pushed onto the gas generator, wherein it adopts the position of rest. In particular, the actuator member in the position of rest is placed and/or pushed onto the gas generator in a form-fitting manner in a direction directed contrary to the linear movement. Especially, the actuator member receives the gas generator at least partially into itself in the inactive state, when it is situated in the position of rest.

Alternatively, the actuator member can be constructed as a piston which is in operative connection with the gas generator. For example, the piston in the position rest is, at least in sections, integrated in the gas generator, pushed in and/or inserted, or it adjoins with a first end onto a front end of the gas generator directed to the opening of the module housing.

When the gas generator adopts the active state, the forces acting there press the actuator member away from the gas generator and in the direction of the opening of the module housing. In particular, the actuator member in the active state of the gas generator is pushed and/or pressed out from the module housing through the opening. Especially, the actuator member, in particular through the expanding airbag, carries out the linear movement through the opening and adopts the activation position, in which it actuates the unlocking mechanism.

In a preferred configuration of the present disclosure, the actuator member is arranged within the airbag. In particular, the actuator member is surrounded by the material of the airbag. Preferably, the material of the airbag closes the opening of the module housing from the interior and thereby in particular separates the actuator member physically from the unlocking mechanism.

A preferred implementation of the present disclosure makes provision that the actuator member includes at least one flow channel arrangement, which is constructed for directing a gas mass flow of the gas. It is preferred that the flow channel arrangement directs the gas mass flow so that the actuator member adopts the activation position and actuates the unlocking mechanism before the airbag adopts an expanded state. In particular, the actuation of the unlocking mechanism is controlled by the actuator member before the expanding of the airbag by the actuator member, in particular through the at least one flow channel arrangement. Thereby it is achieved in an advantageous manner that the engine bonnet is unlocked before the airbag is fully expanded, and raises the engine bonnet, in order to create the buffer zone for the non-occupant of the vehicle and therefore to reduce or minimize effects of the impact.

For example, the at least one flow channel arrangement is constructed as an aperture in the actuator member, in particular in the construction as a cylinder. Preferably, the aperture is closed in the state of rest of the cylinder. This is achieved in particular in that the cylinder in the position of rest is pushed over the gas generator and/or receives the latter into itself. Especially, the gas generator arranged in the cylinder closes the aperture when the cylinder is situated in the position of rest.

Preferably, the aperture is exposed in the activation position of the actuator member. Therefore, the gas generated by the gas generator in the active state can flow through this into the airbag, so that the latter adopts the expanded state. The exposure of the aperture is achieved by the carrying out of the linear movement of the actuator member, when it moves away from the gas generator. The aperture in the cylinder is pressed and/or displaced with the linear movement of the actuator member in the direction of the opening and away from the gas generator. The aperture is then exposed when the cylinder no longer holds the gas generator completely in itself and the gas generator no longer closes the aperture from the interior. Through the fact that the aperture is only exposed in the activation position, it can be achieved in an advantageous manner that the actuator member actuates the unlocking mechanism before the gas generated by the gas generator flows through the exposed aperture into the airbag and expands the latter. In particular, it is thereby ensured that the engine bonnet is already unlocked when the airbag adopts the expanded state, raising the engine bonnet.

In an optional implementation of the present disclosure, the module housing includes at least one guide arrangement, which is constructed for guiding the actuator member in the linear movement through the opening. For example, the at least one guide arrangement is constructed as at least one guide strut or as at least one guide wall. In particular, the at least one guide arrangement is arranged within the module housing, in particular is integrated therein, especially is formed into the interior of the module housing. On carrying out the linear movement and/or transfer from the position of rest into the activation position, the actuator member slides along the guide arrangement. Therefore, it can move in an accurately fitting manner through the opening.

A further object of the present disclosure relates to an airbag module for a or the vehicle. The vehicle has an or the engine bonnet and an or the unlocking mechanism. The engine bonnet is unlocked on actuation of the unlocking mechanism. The airbag module includes a or the module housing, a or the gas generator for the generation of gas at and/or after the impact of the vehicle and an airbag for expanding with the gas. The airbag and the gas generator are arranged in the module housing. The airbag has an activation section which is constructed to actuate the unlocking mechanism in the expanded state of the airbag. In particular, the activation section undertakes the actuation function of the actuator member.

It is advantageous that no actuator member is required for the unlocking of the unlocking mechanism. Therefore, costs and weight in the vehicle can be saved, which can have an advantageous effect on an energy consumption of the vehicle.

In a preferred configuration of the present disclosure, the activation section is formed by the material of the airbag. For example, the activation section is constructed as a convexity in the expanded airbag. Optionally, the expanded airbag thrusts, pushes and/or presses with the activation section against the at least one pivot lever of the unlocking mechanism and actuates the latter, so that the engine bonnet is unlocked.

Preferably within the scope of the present disclosure, a first and second airbag module is proposed, which are constructed and/or are able to be arranged like the previously described airbag module. Optionally within the scope of the present disclosure, a first and second unlocking mechanism is proposed, which are constructed and/or are able to be arranged like the previously described unlocking mechanism.

A further object of the present disclosure relates to a vehicle with the airbag module as described herein. The vehicle includes the unlocking mechanism and a front body section. The front body section is arranged at the front in the direction of travel of the vehicle and includes the defined region and the engine compartment. Preferably, the defined region and the engine compartment are arranged beneath the engine bonnet. In particular, the defined region extends between the rear edge of the engine bonnet in the direction of travel and the rear engine compartment seal. Especially, the defined region is arranged separated spatially from the engine compartment and/or spaced apart with respect thereto. Optionally, the defined region is separated from the engine compartment by the engine compartment seal. It is possible within the scope of the present disclosure that the defined region is delimited by a right-hand rear corner of the engine bonnet in the direction of travel of the vehicle, the rear edge of the engine bonnet, by a left-hand rear corner of the engine bonnet and by the engine compartment seal.

The vehicle has the engine bonnet which is pivotably connected with the front body section. In a closed position, the engine bonnet closes the defined region and optionally additionally the engine compartment. On actuation of the unlocking mechanism, in particular by the actuator member or by the airbag, the engine bonnet is unlocked so that it is able to be transferred from the closed position into an open position.

In the open position, the engine bonnet at least partially exposes the defined region. For example, in the open position the engine bonnet is pivoted in an angle of at least 15 degrees, preferably of at least 30 degrees, in particular of at least 45 degrees, with respect to the front body section, and is thereby at least partially opened. In particular, aside of the engine bonnet, directed to the windscreen of the vehicle, is raised. Optionally in addition, it is possible that the opposite side of the engine bonnet is likewise raised. Through the unlocking and the thereby enabled open position of the engine bonnet, the buffer zone is created in an advantageous manner by the expanded airbag, arranged at least partially and/or in sections beneath the engine bonnet. Thereby, the effects to the non-occupant can be reduced and/or minimized on an impact onto the engine bonnet.

In a preferred configuration of the present disclosure, the unlocking mechanism is constructed as the hinge arrangement with the at least one pivot lever. Preferably, the pivot lever pivots on actuation of the unlocking mechanism about a pivot axis and thereby unlocks the engine bonnet. In particular, the pivot lever releases the engine bonnet on pivoting about the pivot axis for the transfer from the closed position into the open position. In particular, the engine bonnet is unlocked on actuation of the unlocking mechanism and/or by the pivoting of the pivot lever about the pivot axis.

It is preferred that the engine bonnet in the unlocked state, in particular after the actuator member has actuated the unlocking mechanism, is able to raised by the expanding airbag. In particular, the engine bonnet is able to be transferred from the closed position into the open position, when the airbag adopts the expanded state. In particular, the unlocked engine bonnet is raised by the airbag expanding beneath the engine bonnet, especially by the volume of the airbag situated in the expanded state. Through the fact that the expanding or the expanded airbag raises the engine bonnet, in an advantageous manner additional lifting arrangements, for example pyrotechnic arrangements, can be dispensed with. Thereby, the overall costs of the vehicle can be reduced and installation space in the defined region can be saved.

Preferably, the airbag in the expanded state is arranged in sections beneath the raised engine bonnet and at the same time in sections outside and/or above the engine bonnet. Beneath the engine bonnet, the expanded airbag preferably acts in a resilient and/or buffering manner. Outside and/or above the engine bonnet, it covers for example a rear margin region of the windscreen, in the direction of travel, the rear edge of the engine bonnet and/or at least one of the A-columns of the vehicle. Therefore, the non-occupant can be intercepted by the airbag when he impacts onto the engine bonnet, against the windscreen and/or one of the A-columns.

It is furthermore advantageous that the airbag combines within it several functions. An optional function is the unlocking of the unlocking mechanism by the expanded airbag itself, in particular by the activation section. A further function is the raising of the engine bonnet after the unlocking by the actuator member. An additional function is the buffer function of the expanded airbag beneath the engine bonnet. A further function is the intercepting function of the expanded airbag outside and/or above the engine bonnet, in which it intercepts the non-occupant, who strikes onto the engine bonnet and/or impacts against the windscreen and/or against one of the A-columns of the vehicle. In particular, on striking and/or impacting of the non-occupant, the airbag acts elastically and/or resiliently, in particular in a damping manner with a reduced level of force, when it implements the buffer- and/or intercepting function.

In a particularly preferred implementation of the present disclosure, the airbag module and the unlocking mechanism together form a self-retaining assembly. In particular, the self-retaining assembly is able to be installed, during the manufacture of the vehicle, preferably in a modular manner, into the vehicle, in particular into the defined region. It is preferred here that the self-retaining assembly is able to be arranged and/or is arranged spaced apart and separately with respect to the engine block in the defined region. In particular, the self-retaining assembly is arranged in the direction of travel of the vehicle between the rear edge of the engine bonnet and the rear engine compartment seal. It is preferred that the self-retaining assembly is arranged in an installation area of a maximum of 550 mm×550 mm, preferably of a maximum of 500 mm×500 mm, in the defined region. Preferably, the installation area terminates flush with a side edge of the engine bonnet and/or with the left-hand or right-hand rear corner of the engine bonnet.

It is particularly preferred that the self-retaining assembly is connected to the front body section rigidly with respect to movement, in particular is fastened thereon. Alternatively, it is possible that the self-retaining assembly is arranged and/or fastened on the engine bonnet, in particular on an underside of the engine bonnet, and is pivotable together therewith from the closed position into the open position. For example, the module housing is arranged and/or aligned e.g. within the self-retaining assembly, in line with, in particular parallel to, a longitudinal center axis of the vehicle.

Alternatively, it is possible that the module housing is arranged and/or aligned transversely, in particular horizontally, to the longitudinal center axis of the vehicle.

In a preferred implementation of the present disclosure, an installation area of the self-retaining assembly is a maximum of about 0.27 m² (420 in²), preferably a maximum of about 0.25 m² (390 in²), and in particular a maximum of about 0.22 m² (340 in²). Thereby, a space-saving integration of the self-retaining assembly into the defined region of the vehicle is made possible.

For example, the self-retaining assembly has a rectangular or square outer contour. Preferably, one side of the outer contour runs parallel to the longitudinal center axis of the vehicle. Optionally, one corner of the outer contour of the self-retaining assembly is arranged overlapping with a rear corner of the engine bonnet, e.g. directed to a windscreen of the vehicle.

In a further possible configuration of the present disclosure, the actuator member and the hinge arrangement are arranged spaced apart from one another within the self-retaining assembly, when the actuator member is situated in the position of rest. Preferably, the distance between the actuator member in the position of rest and the hinge arrangement is at least about 50 mm (2 in) and/or a maximum of about 300 mm (11.8 in), preferably a maximum of about 250 mm (9.8 in). In particular, the actuator member covers a linear movement of at least about 50 mm (2 in), in order to actuate the unlocking mechanism of the engine bonnet. Through the small but functional distance between the actuator member and the unlocking mechanism, the force transmitted via the linear movement of the actuator member can be transmitted effectively and without greater deformations in the defined region, in the front body section and/or on the engine bonnet onto the unlocking mechanism. Furthermore, the self-retaining assembly can be kept compact and can thereby be installed in a space-saving manner in the defined region.

It is possible within the scope of the present disclosure that the vehicle includes at least a first self-retaining assembly and at least a second self-retaining assembly. Preferably, the first self-retaining assembly has a first unlocking mechanism and a first airbag and the second self-retaining assembly has a second unlocking mechanism and a second airbag.

Optionally, the two unlocking mechanisms are able to be actuated by a first actuator member of the first self-retaining assembly and by a second actuator member of the second self-retaining assembly, in particular as previously described.

Particularly preferably, the first and second airbag in the expanded state together raise the unlocked engine bonnet, so that it is transferred from the closed position into the open position. Optionally, the first and second airbag in the expanded state are arranged at least partially and/or in sections beneath the engine bonnet and at least partially and/or in sections above the engine bonnet.

In a preferred implementation of the present disclosure, the first and second self-retaining assembly are arranged beneath the engine bonnet, in particular in the defined region. Preferably, the first self-retaining assembly is installed in a first installation area and the second self-retaining assembly is installed in a second installation area in the defined region. It is preferred that the first and second self-retaining assembly and/or the installation areas thereof are arranged mirror-symmetrically to a longitudinal center axis of the vehicle in the defined region. Optionally, the first self-retaining assembly adjoins the right-hand rear corner and/or right-hand side edge of the engine bonnet, in the direction of travel, and the second self-retaining assembly adjoins the left-hand rear corner and/or left-hand side edge of the engine bonnet in the direction of travel, and/or is arranged overlapping with respect thereto.

Through the installation of the at least one first and second self-retaining assembly, the engine can be unlocked and raised even more effectively. Furthermore, through the double-acting buffer- and/or intercepting function beneath and above and/or outside the engine bonnet of the expanded airbag, an increased protection can be provided on impact of the non-occupant onto the engine bonnet, the windscreen and/or onto at least one of the A-columns.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the present disclosure or the application and uses of the present disclosure. Furthermore, there is no intention to be bound by any theory presented in the preceding background of the present disclosure or the following detailed description. Parts which are corresponding to or identical to one another are given the same reference numbers respectively in the figures.

Figure 1:
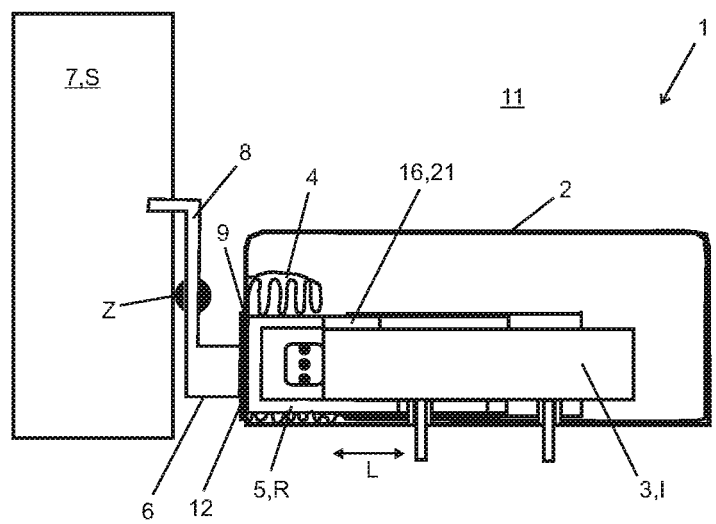
FIG. 1 schematically illustrates an embodiment of the airbag module for a vehicle with an actuator member in a position of rest and with a folded- and/or rolled-up airbag.

FIG. 1 shows an airbag module 1 for a vehicle, in particular for a passenger car or a lorry, as a first example embodiment of the present disclosure. The airbag module 1 is integrated in a defined region 11 of a front body section 13 (FIGS. 6 to 7) of the vehicle, or respectively is installed therein. The front body section 13 includes the defined region 11 and an engine compartment 23. The defined region 11 is arranged, in the direction of travel of the vehicle, between a rear edge of an engine bonnet or hood 7 and a rear engine compartment seal 22. In particular, the defined region 11 and the engine compartment 23 (see FIGS. 6; 7) are divided by the rear engine compartment seal 22 and/or separated spatially from one another.

The airbag module 1 includes a module housing 2 with a plurality of outer sides which enclose a receiving space. An opening 9 is introduced into one of the outer sides. The opening is covered and/or closed by a covering arrangement 12. The covering arrangement 12 is constructed as a covering film which is able to be destroyed and/or penetrated by the application of a force. The covering arrangement 12 prevents the penetration of dirt and dust into the receiving space of the module housing 2.

The airbag module 1 has a gas generator 3 and an airbag 4. The gas generator 3 and the airbag 4 are arranged in the module housing 2, in particular in the receiving space and are completely surrounded by outer sides of the module housing 2. The airbag 4 is arranged, rolled up and/or folded up, in the module housing 2. It is constructed as a so-called engine compartment airbag for integration into the defined region 11 of the vehicle (see FIGS. 6-7). The gas generator 3 shows, according to FIG. 1, an inactive state I. The airbag 4 is connected fluidically with the gas generator 3. The airbag module 1 has an actuator member 5. In the case of inactivity I of the gas generator 3, the actuator member 5 is situated in a state of rest R according to FIG. 1. In the state of rest R, the actuator member 5 is arranged in the module housing 2, in particular in the receiving space, and is completely surrounded by its outer aides.

The actuator member 5 is constructed as a cylinder, which is placed and/or pushed onto the gas generator 3 in a form-fitting manner in a direction directed away from the opening 9. In particular, the actuator member 5 receives at least partially in itself the gas generator 3 in the construction as a piston. In the construction as a cylinder, the actuator member 5 has at least one flow channel arrangement 16, which is constructed for directing and controlling a gas mass flow of the gas. The flow channel arrangement 16 is constructed as an aperture 21 in the cylinder. In the state of rest R of the actuator member 5 according to FIG. 1, the aperture 21 is closed from the interior by the gas generator 3 which is arranged there.

The defined region 11, in which the airbag module 1 is arranged, is covered by the engine bonnet 7 of the vehicle. Here, the engine bonnet 7 adopts a closed position S according to FIG. 1. The vehicle has an unlocking mechanism 6, which is constructed as a hinge arrangement with at least one pivot lever 8. The hinge arrangement is constructed as a rear engine bonnet hinge directed in direction of travel F. It is arranged outside the module housing 2 and adjacent to the latter. Thereby, the unlocking mechanism 6 in the state of rest R of the actuator member 5 is arranged spaced apart with respect thereto and/or uncoupled therefrom.

The unlocking mechanism 6 is operatively connected with the engine bonnet 7. In the closed position S of the engine bonnet 7, the at least one pivot lever 8 engages in a form-fitting manner into amount of the engine bonnet 7, so that the latter is locked. When the unlocking mechanism 6 is actuated, the pivot lever 8 pivots about a pivot axis Z, wherein it moves out from the mount and thereby unlocks the engine bonnet 7. In particular, the engine bonnet 7, on actuation of the unlocking mechanism 6 is released for transfer from the closed position S into an open position O. In the open position (according to FIG. 3), the engine bonnet 7 exposes the defined region 11 at least partially for an access from the exterior.

Figure 2:
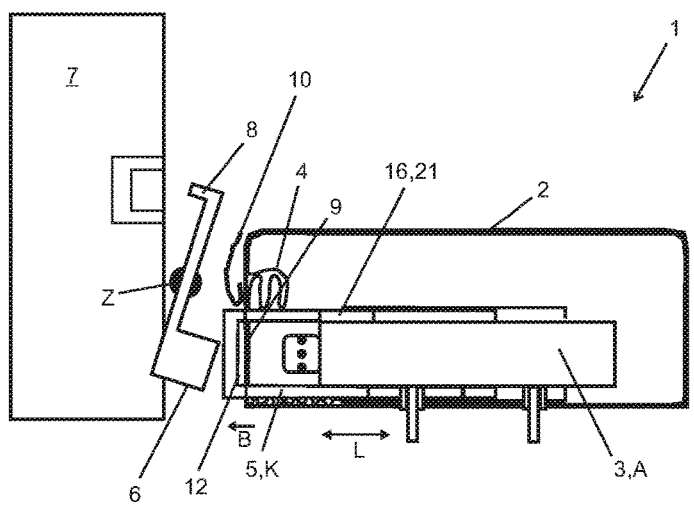
FIG. 2 shows the airbag module of FIG. 1, wherein the actuator member carries out a linear movement and is transferred from the position of rest into an activation position.

As shown in FIG. 2, the gas generator 3 is ignited on and/or after an impact of the vehicle and transferred into an activated state A. In the activated state A, the gas generator 3 generates gas. The gas flows into the actuator member 5 in the construction as a cylinder, whereby the actuator member 5 is pressed and/or pushed in the direction of the opening 9. In particular, the actuator member 5 is pressed and/or pushed in the direction of the opening 9 by forces which act through the activation and/or igniting of the gas generator 3, especially through the pressure of the gas flow of the generated gas.

The actuator member 5 thereby carries out a linear movement B. The linear movement B is in line to and/or parallel to a longitudinal extent L of the gas generator 3. Through the linear movement B, the actuator member 5 exits through the opening 9 out of the module housing 2 into the defined region 11 of the vehicle. The opening 9 is arranged and/or constructed flush with the linear movement B. On exit from the module housing 2, the actuator member 5 penetrates the covering arrangement 12, which closes the opening 9.

In the activated state A of the gas generator 3, the actuator member 5 is transferred from the position of rest R into an activation position K. In the activation position K, the actuator member 5 actuates the unlocking mechanism 6 and thereby unlocks the engine bonnet 7 of the vehicle. In particular, the actuator member 5 strikes onto the at least one pivot lever 8 of the unlocking mechanism 6, no that the latter is actuated, the pivot lever 8 pivots about the pivot axis Z and thereby unlocks the engine bonnet 7.

Figure 3:
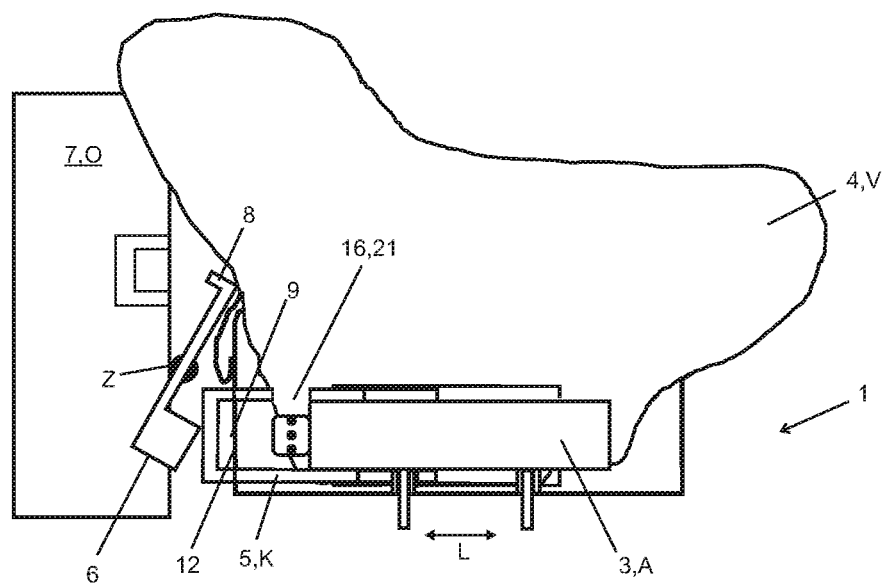
FIG. 3 shown the airbag module of FIGS. 1 and 2 with the airbag in the expanded state.

As is shown in FIG. 3, the aperture 21 in the cylinder is exposed on the transfer of the actuator member 5 from the position of rest R into the activation position K. In particular, through the linear movement B of the actuator member 5, it is no longer closed from the interior by the gas generator 3. The exposed aperture 21 enables a direct flow connection between the gas generated by the gas generator 3 and the airbag 4. In particular, the gas can flow into the airbag 4 through the exposed aperture 21. In particular, the flow channel arrangement 16 directs the gas through into the airbag 4, whereby the latter is transferred into the expanded state V.

In summary, the gas generator 5 takes up a dual function. As first function, it transfers the actuator member 5 on and/or after its activation from the position of rest R into the activation position K. As second function, it generates the gas in order to expand the airbag 4, in particular to transfer the airbag 4 into the expanded state V. Through the fact that the aperture 21 is only exposed in the activation position K of the actuator member 5, the airbag 4 is only transferred into the expanded state V after the actuation of the unlocking mechanism 6 and after the unlocking of the engine bonnet 7.

In the expanded state V, the airbag 4 presses with its volume against the already unlocked engine bonnet 7 and raises the latter upwards thereby, whereby the engine bonnet 7 is transferred into the open position O. Owing to the raising function by the airbag 4, further additional raising arrangements, e.g. pyrotechnic arrangements, can be dispensed with and thereby costs and installation space can be saved. In the open position O through the expanded airbag 4 beneath the engine bonnet 7 a buffer zone is created for a non-occupant of the vehicle, e.g. for a pedestrian. The airbag 4 arranged and inflated beneath the engine bonnet 7 acts in an elastic and resilient manner when the non-occupant strikes onto the engine bonnet 7. Thereby, effects to the non-occupant can be reduced or minimized. Furthermore, the expanded airbag 4 is arranged at least partially and/or in sections outside and/or above the engine bonnet 7 and in so doing covers a lower margin region of the windscreen, a rear edge of the engine bonnet 7 in the direction of travel and/or at least one of the A-columns of the vehicle. Thereby, the airbag 4 takes up an intercepting function for the non-occupant, who impacts against the engine bonnet, the windscreen and/or one of the A-columns.

Figure 4:
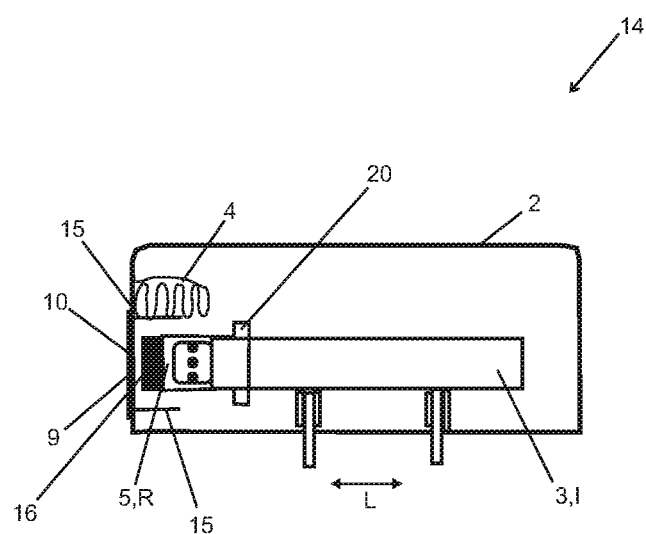
FIG. 4 illustrates an embodiment of the airbag module with the actuator member in the position of rest and with the folded- and/or rolled-up airbag.

FIG. 4 shows an alternative airbag arrangement 14 as a further example embodiment of the present disclosure. The alternative airbag module 15 is integrated into defined region 11 and has basically the same structure and the same functionalities as the airbag module 1 described in FIGS. 1 to 3. FIG. 4 shows the gas generator 3 in the inactive state I and the airbag 4, connected fluidically therewith, in the folded- and/or rolled-up state.

The configuration and arrangement of the actuator member 5 in the receiving space of the module housing 2 is different to the airbag module 1 of FIG. 1. It is integrated into the airbag 4, in particular surrounded by a material of the airbag 4. The actuator member 5 is constructed as an alternative cylinder. The alternative cylinder has on the end face a collar 20, which projects radially from the cylinder.

The module housing 2 of the alternative airbag module 14 is modified in that it has at least one guide arrangement 15, which is constructed for guiding the actuator member 5 on the carrying out of the linear movement B. In particular, the guide arrangement 15 guides the actuator member 5 on its path through the opening 9 and out from the module housing 2. The at least one guide arrangement 15 is constructed as at least one guide wall and/or guide strut and is arranged in the receiving space of the module housing 2, e.g. is formed into it.

The opening 9 in the side wall of the module housing 2 is closed from the interior by the material of the airbag 4. Optionally in addition the opening can be closed on the outer side by the covering arrangement 10.

Figure 5:
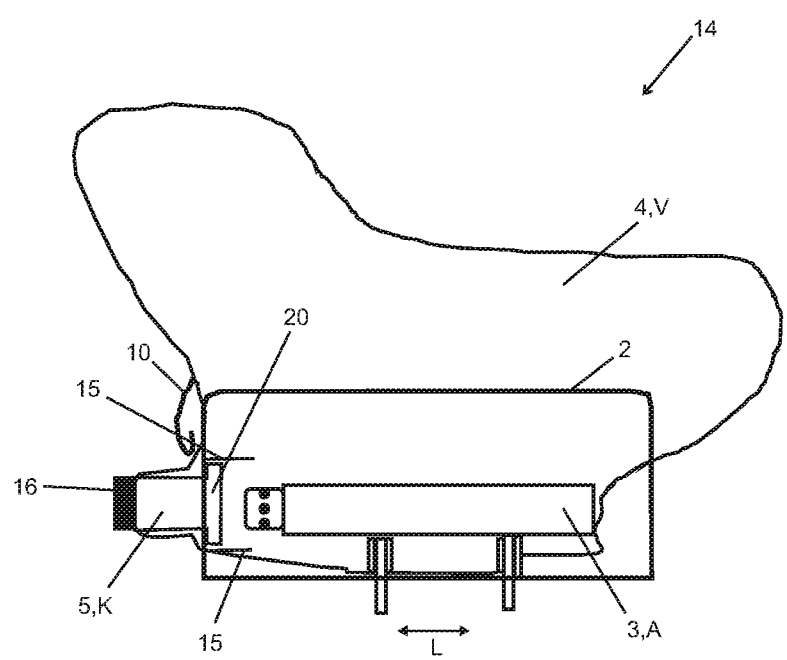
FIG. 5 shows the airbag module of FIG. 4, wherein the actuator member adopts the activation position and the airbag is in the expanded state.

In the activated state A of the gas generator 3 according to FIG. 5, the gas generator 3 generates the gas, whereby the actuator member 5 in the construction as the alternative cylinder is pressed and/or pushed in the direction of the opening 9. In particular, the actuator member 5 is set into the linear movement B by the gas flow of the generated gas. For this, this gas flow is firstly directed principally in the direction of the linear movement B and into the alternative cylinder. Thereby, the actuator member 5 is transferred from the position of rest R into the activation position K and the unlocking mechanism 8 is actuated.

The actuator 5 is pressed so far in the direction of the opening 9 until the collar 20 of the alternative cylinder, arranged on end face, butts against an inner side of the side wall, which has the opening 9. Thereby, the actuator member 5 is stopped in its linear movement B, so that it cannot fall inadvertently into the defined region 11 of the vehicle. At the same time, the opening 9 is closed from the interior by the collar 20 of the alternative cylinder, so that the gas cannot escape through the opening 9 and flows exclusively into the airbag 4, in order to transfer the latter into the expanded state V. Thereby, it is ensured that the actuator member 5 firstly actuates the unlocking mechanism 8, before the airbag 4 adopts the expanded state V.

In an alternative example embodiment, the airbag 4 in the expanded state V can itself actuate the unlocking mechanism 6 and unlock the engine bonnet 7. For this, the airbag 4 has an activation area, e.g. a convexity formed by the material of the airbag, by which it presses onto the pivot lever 8 and actuates the unlocking mechanism 6. In this further alternative example embodiment, the actuator member 5 can be dispensed with.

As already described with respect to FIG. 3, the airbag 4 in the expanded state V raises the already unlocked engine bonnet 7, in order to transfer it into the open position O. In the expanded state V, the airbag 4 is arranged in sections in the defined region 11, in particular beneath the engine bonnet 7 and at the same time in sections above and/or outside the engine bonnet 7. There, it covers the lower edge of the windscreen, the rear edge of the engine bonnet 7 and/or at least one of the A-columns of the vehicle. In it, the airbag combines several functions. On the one hand, it undertakes the unlocking function automatically, in particular without the actuator member 5, or in cooperation with the actuator member 5, by which unlocking function unlocking mechanism 6 is actuated. On the other hand, the airbag 4 undertakes the raising function of the engine bonnet 7, the buffer function beneath the engine bonnet and the intercepting function above and/or outside the engine bonnet. Thereby, adverse effects to the non-occupant can be reduced or minimized in a frontal collision with the vehicle.

Figure 6:
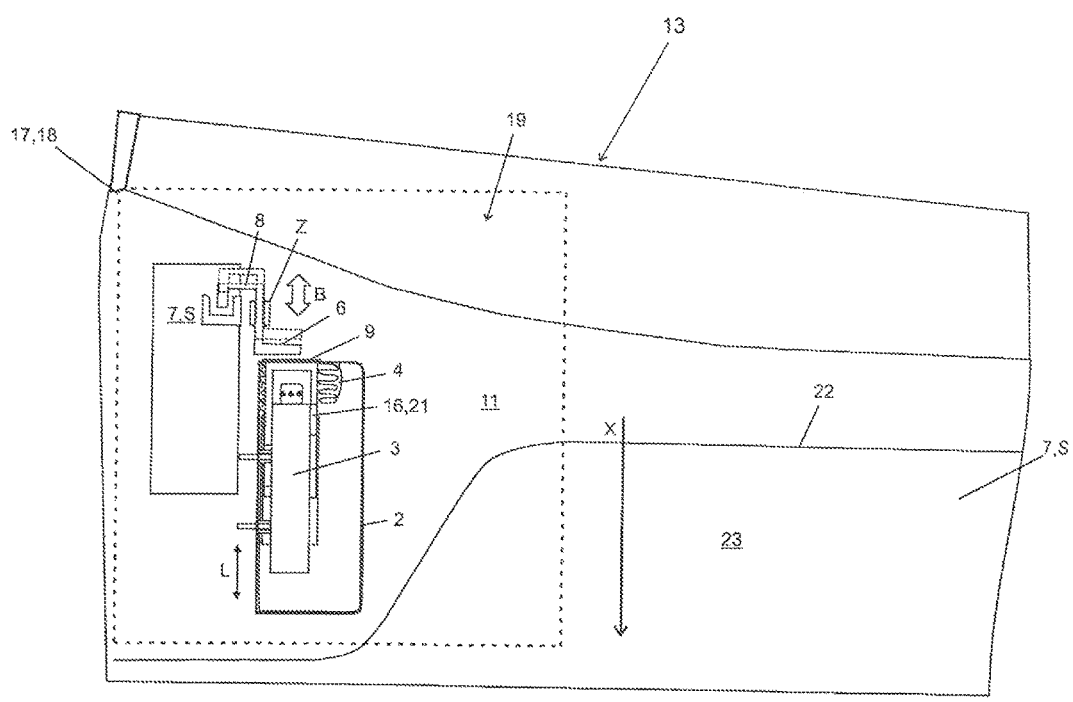
FIG. 6 illustrates a body front section of a vehicle, wherein the airbag module is aligned in line to a longitudinal center axis of the vehicle.

FIG. 6 shows a top view from above onto a front body section 13 of the vehicle. The engine bonnet 7 is situated in the closed position S and covers the defined region, 11 arranged there beneath, and the engine compartment 23 of the vehicle. The defined region 11 is separated from the engine compartment 23 by the engine compartment seal 22. The airbag module 1 and the unlocking mechanism 8 are arranged in the defined region 11. The engine bonnet 7 is illustrated so as to be transparent, so that the airbag module 1 and the unlocking mechanism 6 can be illustrated in a visible manner.

The airbag module 1 and the unlocking mechanism 8 form together a self-retaining assembly 19. The self-retaining assembly 19 is arranged in the defined region 11 and has a rectangular or square outer contour with an installation area of a maximum of about 0.27 m$^2$ (420 in$^2$), preferably a maximum of about 25 m$^2$ (390 in$^2$), and in particular a maximum of about 0.22 m$^2$ (340 in$^2$). In particular, the self-retaining assembly 19 is arranged in an installation area of a maximum of about 550 mm×550 mm (21.7 in×21.7 in), preferably of a maximum of about 500 mm×500 mm (19.7 in×19.7 in).

Figure 7:
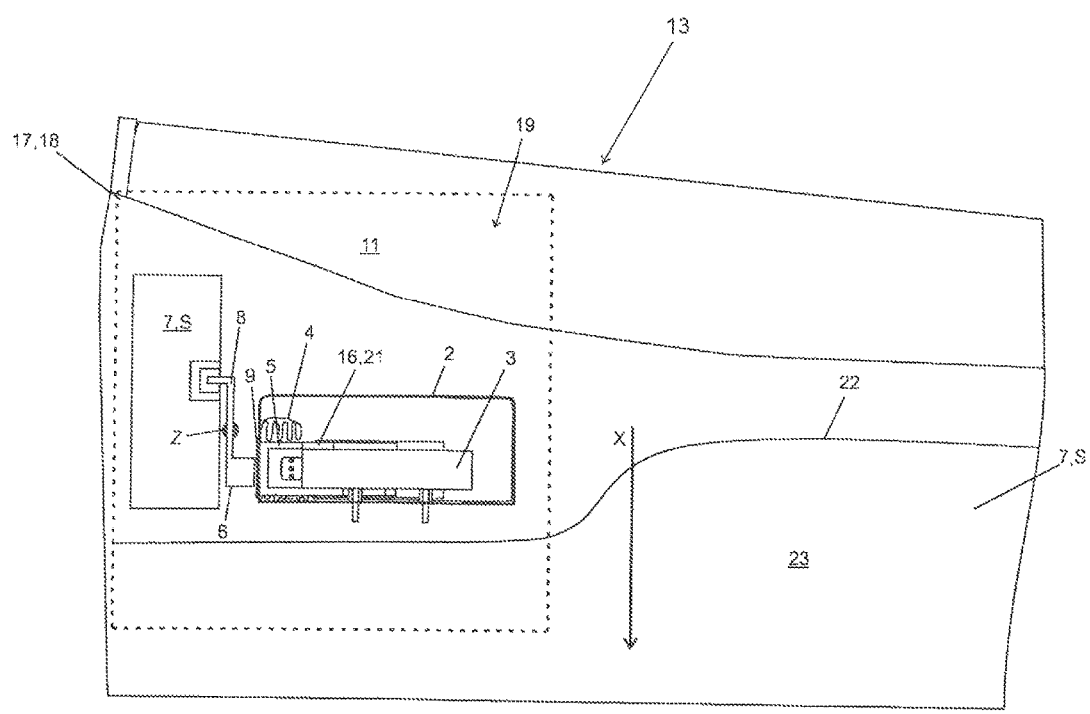
FIG. 7 shows the body front section of a vehicle, wherein the airbag, module is aligned transversely to the longitudinal center axis of the vehicle.

One side of the outer contour runs in line and/or parallel to a longitudinal center axis X of the vehicle. A rear left-hand corner of the outer contour in the image top view onto FIG. 7 is arranged overlapping with a rear left-hand corner of the engine bonnet 7. Alternatively also the rear right-hand corners or the left-hand or right-hand front corners of the engine bonnet 7 and the outer contour of the self-retaining assembly 19 can overlap. The self-retaining assembly 19 is connected rigidly with the front body section 13 and/or fastened thereon. Alternatively, the self-retaining assembly 19 can be fastened to the engine bonnet 7 and pivoted with the latter from the closed position S into the open position O.

According to FIG. 6, the airbag module 1 is arranged and/or aligned in line and/or parallel to the longitudinal center axis X of the vehicle. Alternatively, the airbag module 1, as shown in FIG. 7, can also be arranged and/or aligned transversely, in particular horizontally to the longitudinal center axis X of the vehicle.

FIG. 6 shows the actuator member 5 in the state of rest R. In the state of rest R, the actuator member 5 is uncoupled from the unlocking mechanism 6. In particular, the actuator member 5 in the state of rest R is arranged spaced apart from the unlocking mechanism 6. A distance between the actuator member 5 in the state of rest R and the unlocking mechanism 6 is about at least 50 mm (2 in) and/or a maximum of about 300 mm (11.8 in), preferably a maximum of about 250 mm (9.8 in).

Owing to the distance between the actuator member 5 and the unlocking mechanism 6, the actuator member 5 can carry out the linear movement B and actuate the unlocking mechanism 6. The indicated maximum distance contributes advantageously to a compact configuration of the self-retaining assembly 16 and to a space-saving integration into the defined region 11.

In an alternative example embodiment, a plurality of self-retaining assemblies, in particular two, can also be arranged in the front body section. These are preferably arranged mirror-symmetrically to the longitudinal center axis of the vehicle in the front body section and in particular in the defined region. The functions, arrangements and configurations of the first and second self-retaining assembly are like those of the self-retaining assemblies and the components thereof described in FIGS. 1 to 6.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. An airbag module for a vehicle having an engine bonnet, the airbag module comprising:
   a module housing;
   a gas generator arranged in the module housing and configured to release gas upon an impact of the vehicle;
   an airbag arranged in the module housing and in fluid communication with the gas generator to expand to an expanded state in response to the release of gas from the gas generator; and
   an actuator having an actuator member linearly movable from a first position to a second position,
   wherein the actuator member is arranged in the module housing in the first position, at least a portion of the actuator member extends from the module housing to actuate an unlocking mechanism of the engine bonnet in the second position and the gas generator is operably coupled to the actuator for linearly moving the actuator member.

2. The airbag module according to claim 1, wherein the actuator member in the first position is uncoupled from the unlocking mechanism.

3. The airbag module according to claim 1, wherein the actuator member comprises a slide operably coupled to the gas generator.

4. The airbag module according to claim 3, wherein the actuator comprises at least one flow channel for directing a gas mass flow of the gas to the slide so that the actuator member moves to the second position and actuates the unlocking mechanism before the airbag adopts the expanded state.

5. The airbag module according to claim 4, wherein the at least one flow channel arrangement comprises an aperture in the actuator, wherein the aperture is closed in the first position and is exposed in the second position such that gas can flow into the airbag through the aperture.

6. A vehicle comprising a vehicle body having an engine bonnet and an unlocking mechanism releasably securing the engine bonnet to a vehicle, wherein the engine bonnet is unlocked on actuation of the unlocking mechanism by the airbag module according to claim 1.

7. The vehicle according to claim 6, further comprising a front body section defining an engine compartment having a defined region which in a direction of travel of the vehicle is arranged between a rear edge of the engine bonnet and a seal disposed at a rear of the engine compartment, wherein the engine bonnet is pivotably connected with the front body section and positionable in a closed position which encloses the defined region, and an open position wherein the engine bonnet upon on actuation of the unlocking mechanism transferred from the closed position into the open position, in which the defined region is at least partially exposes.

8. The vehicle according to claim 7, wherein the unlocking mechanism comprise a hinge arrangement with at least one pivot lever, wherein the pivot lever upon actuation of the unlocking mechanism pivots about a pivot axis and frees the engine bonnet for transfer from the closed position into the open position.

9. The vehicle according to claim 8, wherein the engine bonnet is raised by the airbag in the expanded state and is transferred from the closed position into the open position.

10. The vehicle according to claim 7, wherein the airbag module in combination with the unlocking mechanism forms a self-retaining assembly.

11. The vehicle according to claim 10, wherein the self-retaining assembly in the defined region has an installation area no greater than 0.3 square meters.

12. The vehicle according to claim 11, wherein at least one of the self-retaining assembly and the installation area has an outer contour which runs parallel to a longitudinal center axis of the vehicle and a corner overlapping with a corner of the engine bonnet.

13. The vehicle according to claim 11, wherein the actuator member in the first position and within the self-retaining assembly is arranged spaced apart from the unlocking mechanism by a distance in the range of 50-300 mm.

14. The vehicle according claim 6, wherein the airbag in the expanded state is arranged partially beneath the engine bonnet and at the same time partially above the engine bonnet.

15. An airbag module for a vehicle having an engine bonnet, the airbag module comprising:
   a module housing;
   a gas generator arranged in the module housing and configured to release gas upon an impact of the vehicle;

an airbag arranged in the module housing and in fluid communication with the gas generator to expand to an expanded state in response to the release of gas from the gas generator; and an actuator having an actuator member linearly movable from a first position to a second position, wherein the actuator member is arranged in the module housing in the first position, at least a portion of the actuator member extends from the module housing to actuate an unlocking mechanism of the engine bonnet in the second position and the module housing has an opening aligned with the actuator member for enabling linear movement thereof.

16. The airbag module according to claim 15, wherein the module housing comprises at least one guide for guiding the linear movement of the actuator member through the opening.

17. A vehicle comprising a vehicle body having an engine bonnet and an unlocking mechanism releasably securing the engine bonnet to a vehicle, wherein the engine bonnet is unlocked on actuation of the unlocking mechanism by an airbag module, the airbag module including a module housing, a gas generator arranged in the module housing and configured to release gas upon an impact of the vehicle, an airbag arranged in the module housing and in fluid communication with the gas generator to expand to an expanded state in response to the release of gas from the gas generator, and an actuator having an actuator member linearly movable from a first position to a second position, wherein the actuator member is arranged in the module housing in the first position, at least a portion of the actuator member extends from the module housing to actuate an unlocking mechanism of the engine bonnet in the second position, the vehicle further comprising:

a first self-retaining assembly including a first unlocking mechanism and a first airbag, wherein the first airbag in the expanded state is constructed to actuate the first unlocking mechanism and to unlock the engine bonnet; and an second self-retaining assembly including a second unlocking mechanism and a second airbag, wherein the second airbag in the expanded state is constructed to actuate the second unlocking mechanism and to unlock the engine bonnet;

wherein the first and second airbag in the expanded state together unlock, raise and transfer the engine bonnet from a closed position into an open position; and wherein the first and second airbag in the expanded state are arranged partially beneath the engine bonnet and partially above the engine bonnet.

* * * * *